(12) United States Patent
Alajajyan et al.

(10) Patent No.: US 7,198,219 B1
(45) Date of Patent: Apr. 3, 2007

(54) FISHING REEL TRANSMISSION

(76) Inventors: Harout Alajajyan, 22448 S. Summit Ridge Cir., Chatsworth, CA (US) 91311; Sarkis Alajajyan, 22438 S. Summit Ridge Cir., Chatsworth, CA (US) 91311

( * ) Notice: Subject to any disclaimer, the term of this patent is extended or adjusted under 35 U.S.C. 154(b) by 0 days.

(21) Appl. No.: 11/138,697

(22) Filed: May 27, 2005

(51) Int. Cl.
*A01K 89/01* (2006.01)

(52) U.S. Cl. .................. 242/247; 242/300; 242/256; 242/257; 242/290

(58) Field of Classification Search ............... 242/247, 242/256–259, 262, 296–301
See application file for complete search history.

(56) References Cited

U.S. PATENT DOCUMENTS

| | | | | |
|---|---|---|---|---|
| 4,540,134 A | * | 9/1985 | Schankler | 242/587.3 |
| 4,650,134 A | * | 3/1987 | Councilman | 242/248 |
| 4,919,361 A | * | 4/1990 | Kobayashi | 242/300 |
| 5,458,297 A | * | 10/1995 | Shinohara et al. | 242/247 |
| 5,489,069 A | * | 2/1996 | Shinohara et al. | 242/247 |
| 5,505,396 A | * | 4/1996 | Chesterfield et al. | 242/298 |
| 6,517,021 B2 | * | 2/2003 | Ikuta | 242/247 |
| 6,634,486 B2 | * | 10/2003 | Bennett | 198/631.1 |

* cited by examiner

*Primary Examiner*—Emmanuel Marcelo
*Assistant Examiner*—Evan H. Langdon
(74) *Attorney, Agent, or Firm*—William W. Haefliger

(57) ABSTRACT

Fishing reel control apparatus, comprising a pulley carried for rotation in opposite directions; a ratchet wheel carried for rotation; a spring wire wrapped about a portion of the pulley and having a projecting end; a pivoted dog connected to the wire end so that endwise displacement of the wire effected by pulley rotation operates to release the dog from the ratchet wheel when the pulley is rotated in one direction, whereby a fishing line spool attached to the ratchet wheel is free to rotate, as the line pays out from the spool; and whereby when the pulley is rotated in opposite direction the wire is displaced to pivot the dog into engagement with the ratchet wheel, and the spool is rotated by the ratchet wheel to wrap the line as the pulley is rotated relative to the wire.

6 Claims, 5 Drawing Sheets

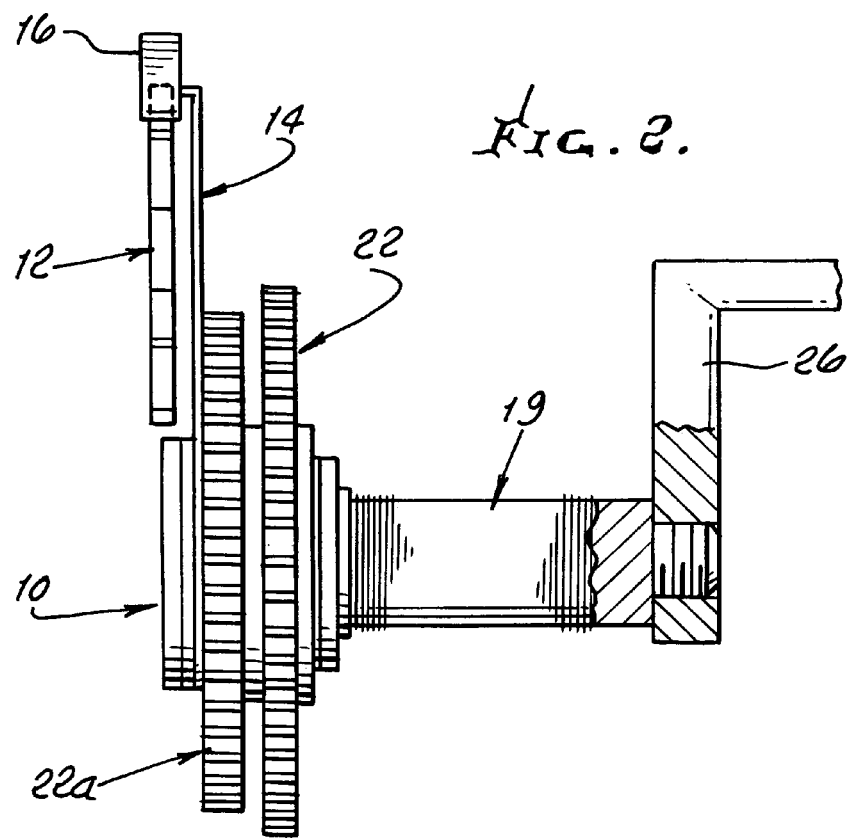

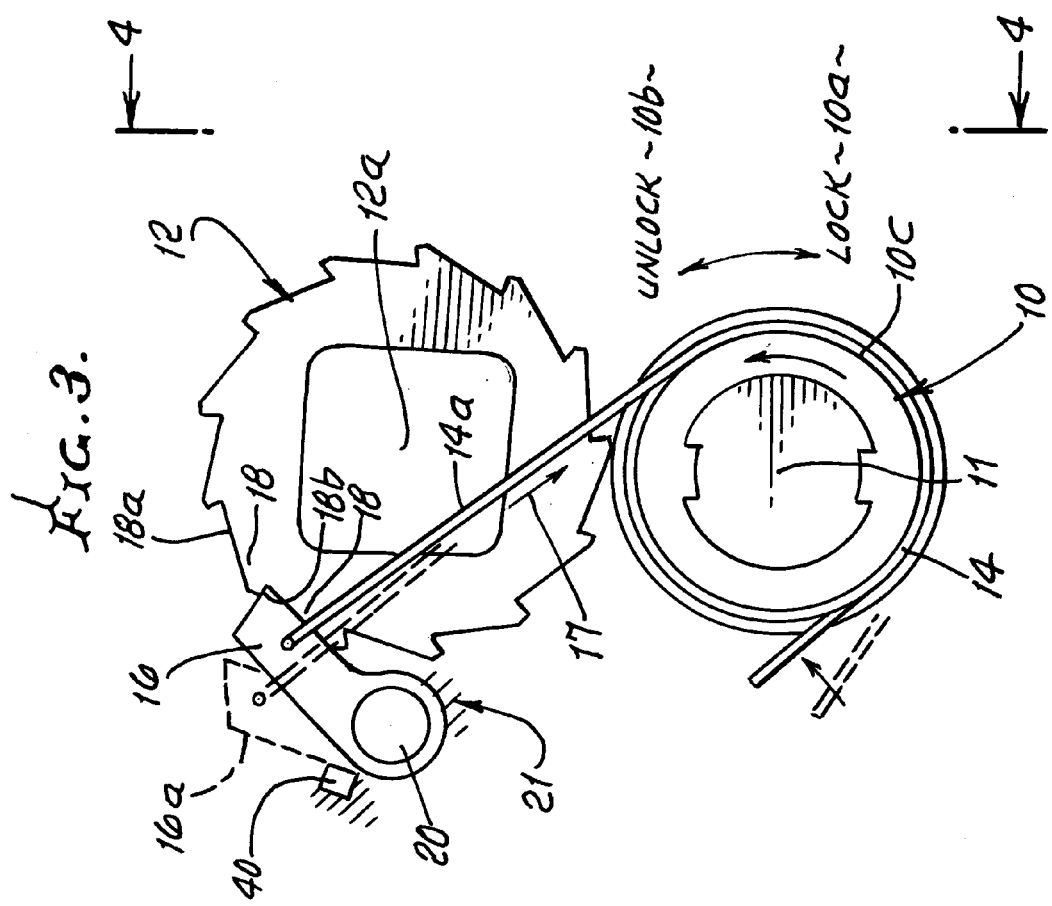
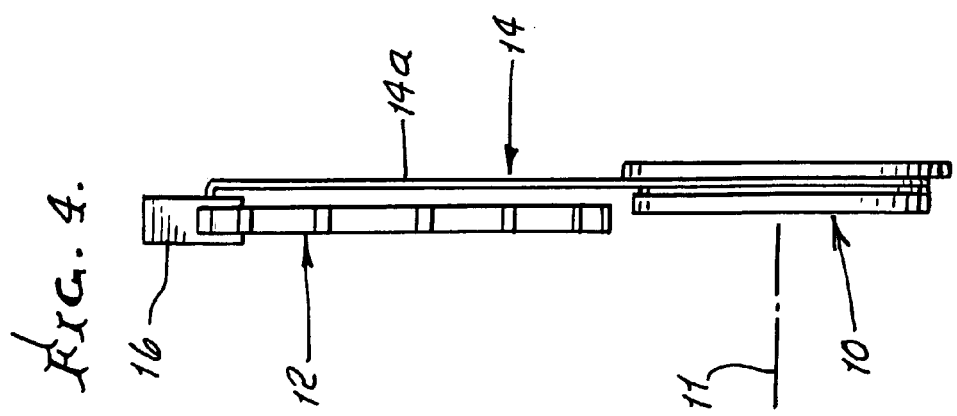

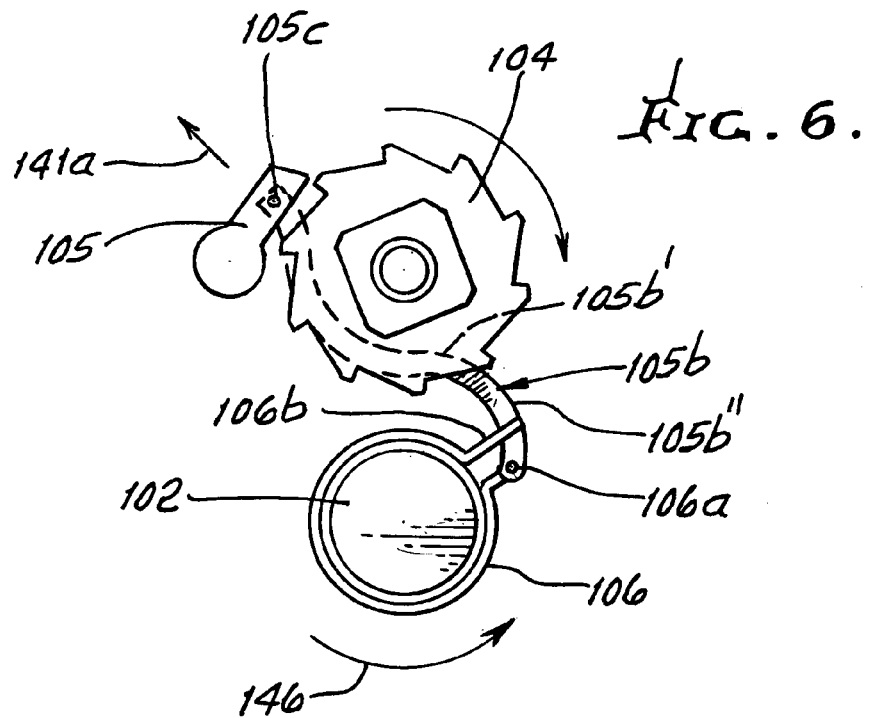
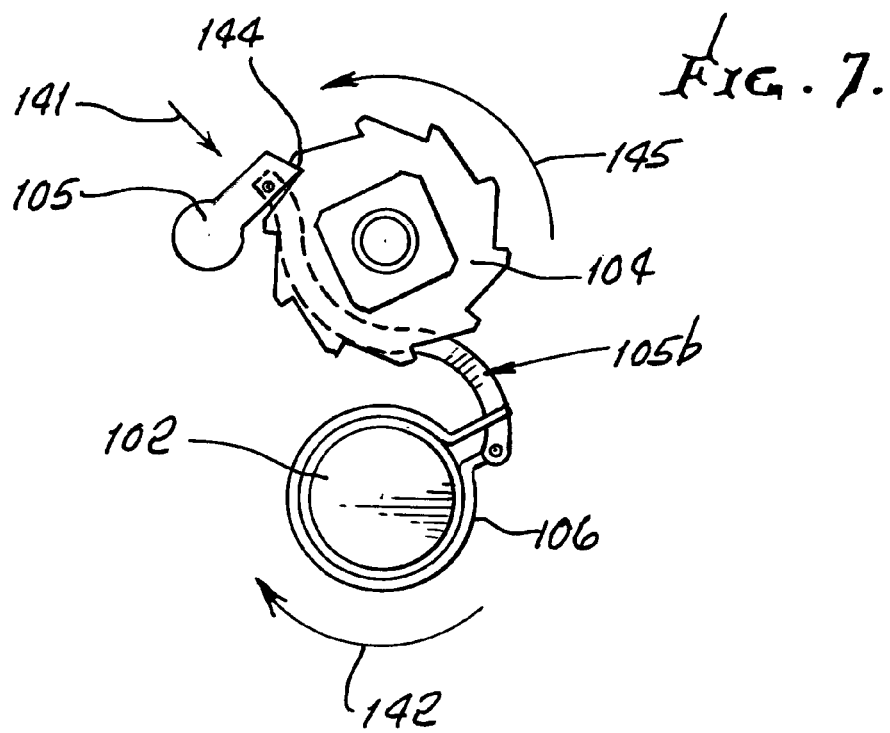

FISHING REEL TRANSMISSION

BACKGROUND OF THE INVENTION

This invention relates generally to fishing reel transmissions, and more specifically to improvements in apparatus associated with line winding and unwinding, and to improved operation of the drag system.

There is need for improvements in fishing reels enhancing ease of use and simplicity of construction, and providing the unusual features of design and modes of operation disclosed herein.

SUMMARY OF THE INVENTION

Objects of the invention include provision of improved control apparatus comprising a) a pulley carried for rotation in opposite directions, b) a ratchet wheel carried for rotation, c) a spring wire wrapped about a portion of the pulley and having a projecting end, d) a pivoted dog connected to said wire end so that endwise displacement of the wire effected by pulley rotation operates to release the dog from the ratchet wheel when the pulley is rotated in one direction, whereby a fishing line spool attached to the ratchet wheel is free to rotate, as the line pays out from the spool, e) whereby when the pulley is rotated in the opposite direction, the wire is displaced to pivot the dog into engagement with the ratchet wheel, and the spool is rotated by the ratchet wheel to wrap the line as the pulley is rotated relative to the wire.

Typically, a control handle is operatively connected with the spool, and gearing is connected between the handle and spool to rotate the pulley at an angular rate greater than the rate of rotation of the handle.

Another object is to provide a pulley first axis of rotation, a ratchet wheel second axis of rotation, those two axes being parallel, and relatively offset. In this regard, the spring wire typically may have a slip fit engagement with the pulley.

Further objects include provision of a spring wire that projects from the pulley toward the dog, and which has support stiffness to push the dog free of the ratchet wheel when the pulley is rotated in said one direction; and provision of gearing coupling the ratchet wheel to the fishing line spool, to lock the spool when the ratchet wheel is locked by the dog against rotation.

An added object is to provide, in combination with a drive gear that drives a fishing reel spool, the following:

a) an anti-reverse gear for blocking reverse rotation of the spool, b) an anti-reverse dog carried by the body to rotate into and out of engagement with said anti-reverse gear, c) a dog arm pivotally connected with the dog, d) a friction spring extending about the drive gear shaft, and connected to said dog arm, e) whereby, drive gear shaft clockwise rotation creates friction spring torque acting to displace said dog arm in one direction to effect engagement of the dog arm with the anti-reverse gear to block counterclockwise rotation of the anti-reverse gear, thereby blocking line unwinding reverse rotation of the spool, f) and drive gear counterclockwise rotation results in dog arm displacement in the opposite direction to effect disengagement of the dog from the anti-reverse gear, thereby unblocking forward line winding rotation of the spool.

As will be seen, the dog is positioned to cross an axial projection of the anti-reverse gear; and the dog typically may have a curved section facing that axial projection.

Also, the anti-reverse gear typically has cogs spaced about its periphery, the cogs being engageable by the dog.

A yet further object is to provide:

a) an anti-reverse gear for blocking reverse rotation of the spool, b) an anti-reverse dog carried by the body to rotate into and out of engagement with said anti-reverse gear, c) a connector connected with the dog, d) and a friction spring extending about the drive gear shaft, and attached to said connector.

These and other objects and advantages of the invention, as well as the details of an illustrative embodiment, will be more fully understood from the following specification and drawings, in which:

DRAWING DESCRIPTION

FIG. 2 is a side view taken on lines 2—2 of FIG. 1;

FIG. 3 is a schematic end view showing interaction between pulley, spring wire, ratchet wheel and dog components;

FIG. 4 is a side view taken on lines 4—4 of FIG. 3; and

FIGS. 5–7 are schematic views showing a modification.

DETAILED DESCRIPTION

Figure 1:
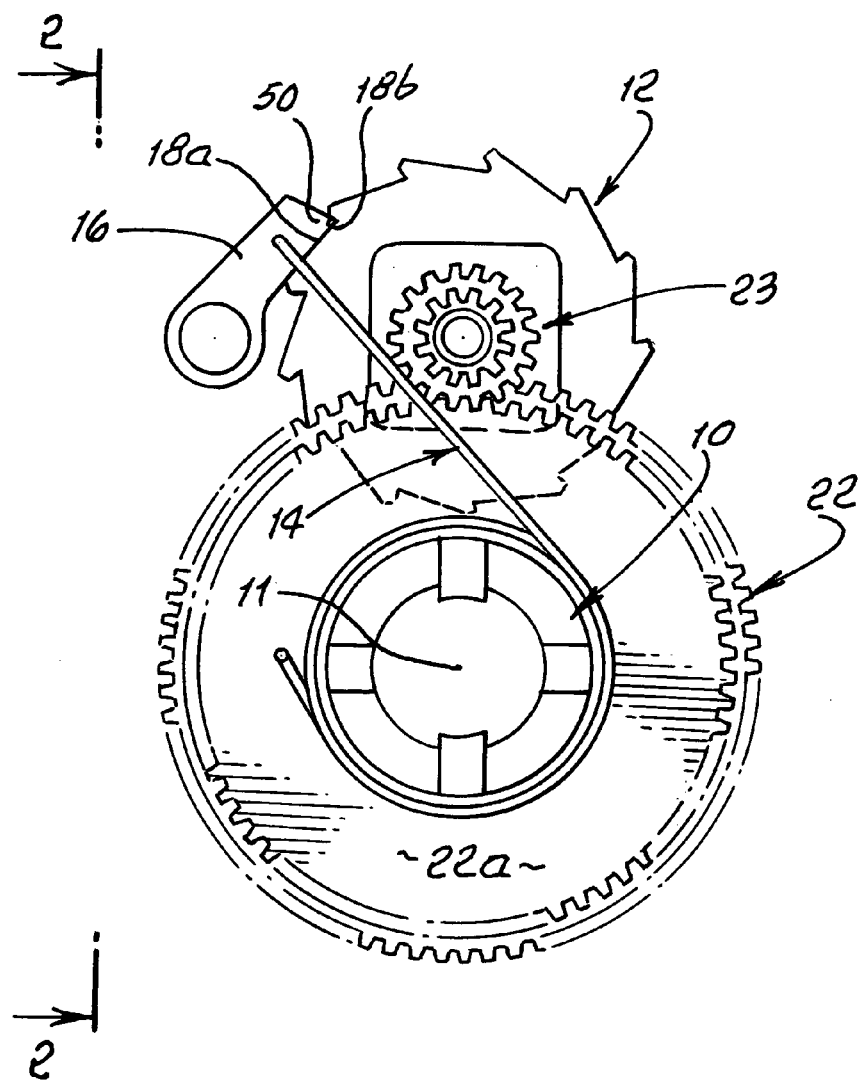
FIG. 1 is an end view of a transmission incorporating the invention.

Referring first to FIGS. 3 and 4, a pulley 10 is carried for rotation in opposite directions, indicated as a lock direction, 10a, and an unlock direction 10b. The pulley axis of rotation is seen at 11, and may be considered as a first axis of rotation.

A ratchet wheel 12 is carried for rotation about a second axis 12a, which is offset from and parallel to axis 11.

A spring wire 14, is entrained by, or wrapped about a portion 10c of the pulley, and has frictional slip-fit engagement with the pulley such that when the pulley is rotated in one direction 10b, a ratchet wheel engaging dog 16 is released from the ratchet wheel (see dog broken line position 16a); and when the pulley is rotated in the opposite direction 10a, the dog is displaced into engagement with the ratchet wheel, i.e. between two cogs 18 (see dog full line position) in FIG. 3. The fishing line spool 19 is then free to rotate, for example as the line pays out from the spinning spool as a hooked fish is allowed to swim away.

It will be observed that the spring wire 14 freely projects at 14a from the pulley toward the dog, and is dimensioned so that it has sufficient stiffness to push the dog free of the ratchet wheel (overcoming dog frictional engagement with that wheel), when the pulley is rotated in direction 10b. On the other hand, the wire sufficiently entrains the pulley during its rotation in direction 10a, so that the wire is frictionally clutched by the pulley to pull the wire in direction 17 and thereby pull the dog into engagement with the ratchet wheel, as between two cogs.

For this purpose, the wire may consist of steel, and have a diameter between 0.020 and 0.030 inches. The dog or pawl is pivoted at 20, to reel frame structure, indicated at 21.

Additional elements of the reel include large gears 22 and 22a of different diameters that may be selectively meshed with a spur gear 23 associated with the ratchet wheel, so that the ratchet wheel rotates when the reel spool 19 rotates. When the dog locks the ratchet wheel against rotation, the fishing line spool is locked against line pay-out rotation; however, when the handle 26 is rotated in a line wind-up direction, the ratchet wheel and spool are rotated, the dog then riding over the cogs of the ratchet wheel. A stop 40 may be provided to limit dog movement away from wheel 12.

It will further be noted that each cog 18 has a long flank 18a and a short flank 18b, the length of the long flank being at least twice the length of the short flank; also the short flank of the cog engaged by the dog extends generally radially toward second axis 12a. In ratchet wheel locked position, the acutely angled tip 50 of the dog nests in a V-shaped groove defined by an intersection the two flanks 18a and 18b of successive cogs. See FIG. 1. Also, note that the projecting extent 14a of the wire extends crosswise of the axially projected body of the ratchet wheel. See FIG. 3.

Figure 5:
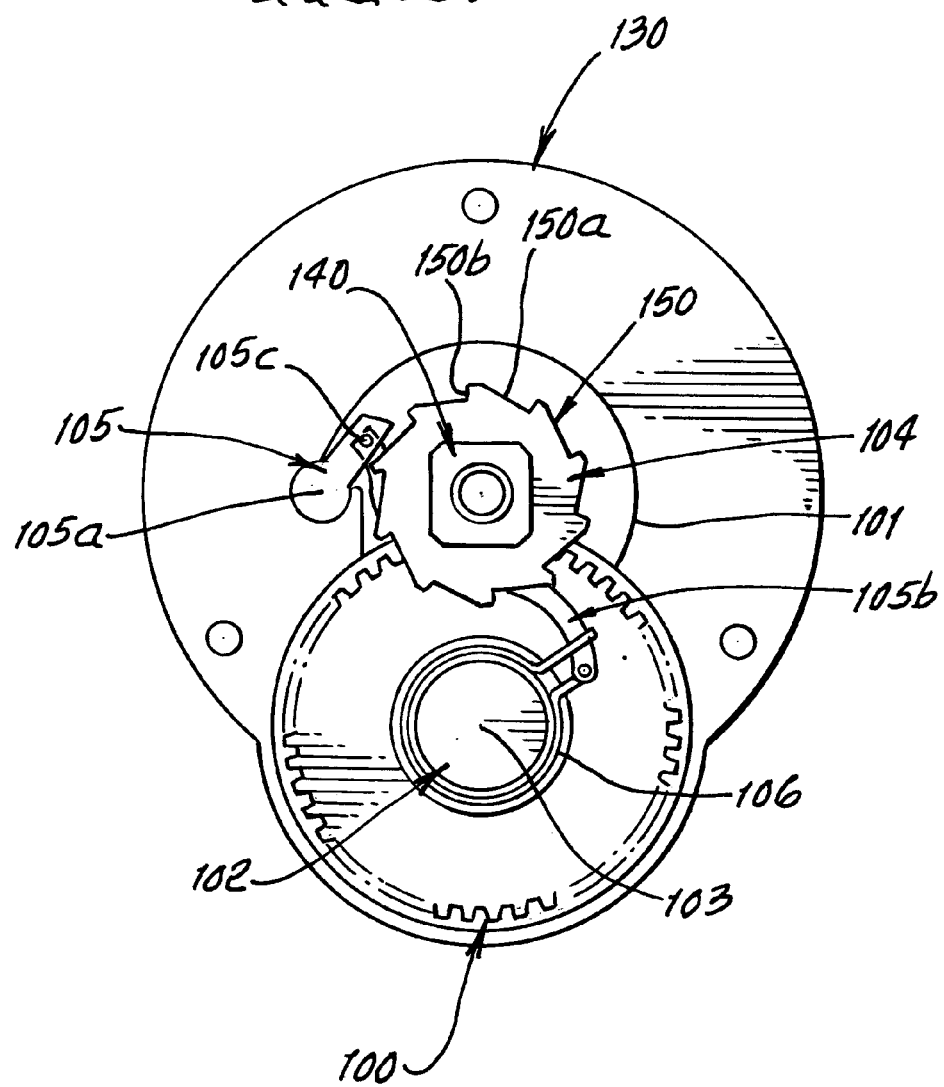

The modification seen in FIGS. 5–7 incorporates a drive gear 100 that drives a fishing reel spool 101, as via pinion 140, relative to the reel body 130, the drive gear having a shaft 102 defining an axis 103. The apparatus includes:

a) an anti-reverse gear 104 for blocking reverse rotation of the spool 101, b) an anti-reverse dog 105 carried by the body 130 to rotate about an axis 105a into and out of engagement with said anti-reverse gear 104, c) a connector such as a dog arm 105b pivotally connected at 105c with the dog, d) a friction spring 106 extending about the drive gear shaft 102, and connected to said dog arm, e) whereby, drive gear shaft 102 clockwise rotation 142 (see FIG. 7) creates friction spring torque acting to bodily displace the dog arm endwise in one direction 141 in the general direction of arm elongation to effect engagement at 144 of the dog 105 with the anti-reverse gear 104 to block counterclockwise rotation (see arrow 145) of the anti-reverse gear, thereby blocking line unwinding reverse rotation of the spool.

Drive gear counterclockwise rotation, shown by arrow 146 in FIG. 6, results in dog arm displacement in the opposite direction 141a to effect disengagement of the dog 105 from the anti-reverse gear 104, thereby unblocking forward line winding rotation of the spool.

It will be seen that the friction spring 106 loops about the axis 103 of the drive gear shaft. Also, the dog arm crosses an axial projection of the anti-reverse gear 104 and the dog arm has a concave-convex curved section 105b' that crosses that axial projection of the gear 104, thereby avoiding pinion 140. Dog arm 105 also has a curved section 105b" that projects outwardly of an axial projection of the anti-reverse gear. Accordingly, the dog arm has S-shaped configuration between connector 105c and the ends 106a and 106b of the spring 106 connected to the dog arm. See FIG. 6

Note further that the anti-reverse gear has angled cogs 150 spaced about its periphery. Cog flanks 150a are angled to allow dog slippage over the cogs during clockwise gear rotation, and flanks 150b that engage the dog to block gear counterclockwise rotation.

We claim:

1. In combination with a drive gear that drives a fishing reel spool, relative to reel axis, the above gear having a shaft, a) an anti-reverse gear for blocking reverse rotation of the spool, b) an anti-reverse dog carried by the body to rotate into and out of engagement with said anti-reverse gear, c) an elongated dog arm pivotally connected with the dog, approximate a dog shoulder that engages the anti-reverse gear, d) a friction spring extending about the drive gear shaft, and connected to said dog arm, e) whereby, drive gear shaft clockwise rotation creates friction spring torque acting to displace said dog arm in one direction to effect engagement of the dog arm with the anti-reverse gear to block counterclockwise rotation of the anti-reverse gear, thereby blocking line unwinding reverse rotation of the spool, f) and drive gear counterclockwise rotation results in dog arm displacement in the opposite direction to effect disengagement of the dog from the anti-reverse gear, thereby unblocking forward line winding rotation of the spool, g) each of said anti-reverse gear, anti-reverse dog, and drive gear shaft have axes of rotation, and all of said axes being parallel, h) and wherein said elongated dog arm crosses a plane created by the rotational axes of the drive gear shaft and the axes of the anti-reverse gear, and is bodily movable endwise to effect dog rotation.

2. The combination of claim 1 wherein said friction spring loops about the axis of the drive gear shaft.

3. The combination of claim 1 wherein the dog arm has a curved section facing said axial projection of the anti-reverse gear.

4. The combination of claim 1 including a pinion gear driven by the drive gear, the pinion gear operatively connected to the spool.

5. The combination of claim 1 wherein said dog arm projects outwardly of an axial projection of the anti-reverse gear, the dog arm having S-shaped configuration along its length.

6. The combination of claim 1 wherein said anti-reverse gear has cogs spaced about its periphery, said cogs having surfaces engageable by said dog.

* * * * *